United States Patent [19]

Yamada

[11] 4,174,080

[45] Nov. 13, 1979

[54] TAPE CASSETTE

[75] Inventor: Hiroyuki Yamada, Hino, Japan

[73] Assignee: Olympus Optical Co., Ltd., Tokyo, Japan

[21] Appl. No.: 961,529

[22] Filed: Nov. 17, 1978

[30] Foreign Application Priority Data

Nov. 25, 1977 [JP] Japan .................. 52-158099[U]

[51] Int. Cl.² .............................................. G03B 1/04
[52] U.S. Cl. .................................................. 242/199
[58] Field of Search ........................... 242/197–200; 360/93, 96, 132; 352/72, 78 R

[56] References Cited

U.S. PATENT DOCUMENTS

| | | | |
|---|---|---|---|
| 3,751,043 | 8/1973 | Bracci | 360/132 |
| 3,826,489 | 7/1974 | Watkins, Jr. | 360/132 |
| 3,891,159 | 6/1975 | Nelson | 242/199 |
| 3,942,744 | 3/1976 | Fitterer et al. | 242/199 |
| 3,977,626 | 8/1976 | Gaiser et al. | 242/199 |

FOREIGN PATENT DOCUMENTS

| | | | |
|---|---|---|---|
| 49-6571 | 2/1974 | Japan | 242/199 |
| 51-63281 | 5/1976 | Japan | 242/199 |

*Primary Examiner*—Leonard D. Christian

[57] ABSTRACT

A tape cassette comprising a pair of case members which are oppositely arranged to form a case body and are each provided with pins at the four corners on the major inner surface, a pair of reel hubs rotatably provided within the case body, and sheet members which are each provided at the four corners with holes and each fixedly attached in place to the major inner surface of the case member in such a manner that the holes receive the corresponding pins on the case member. The interval between each pair of adjacent holes arranged on the sheet member along one of the sides of the sheet member is longer than the corresponding intervals between each pair of adjacent pins arranged on the case member in order that the sheet member bends inwardly within the case body, with the maximally bent center part thereof resiliently contacting the corresponding sides of a tape loaded on the reel hubs.

5 Claims, 10 Drawing Figures

TAPE CASSETTE

BACKGROUND OF THE INVENTION

This invention relates to a tapa cassette capable of preventing irregular winding of a tape traveling within a cassette case.

In general, a conventional tape cassette is provided with a case body including a pair of case members disposed oppositely arranged and housing a magnetic tape, a pair of reel hubs with the tape wound therearound and disposed in the case body, and sheet member for reducing a friction resistance arising in the running of the tape and each disposed onto the major inner surface of each case member. The sheet member is fastened in place onto the major inner surface in a manner that pins planted at the four corners on the inner surface of the case member are inserted into the corresponding holes formed at the four corners of the sheet member.

The sheet member thus attached is flat in the faces so that narrow spaces or gaps exist between the sheet members and both sides of the tape which face the corresponding sheet members. These gaps permit a running tape to move in the direction normal to the tape transporting direction, and therefore such a movement of the tape causes the tape to be wound irregularly. As a result, the side faces of the wound tape are irregular and this causes the tape to be twisted and more adversely to be damaged.

SUMMARY OF THE INVENTION

Accordingly, an object of the invention is to provide a tape cassette capable of preventing an irregular winding of the tape with a very simple construction. According to the invention, there is provided a tape cassette having a pair of case members which are arranged oppositely to form a case body and are each provided with pins at the four corners on the major inner surface, a pair of reel hubs rotatably provided within the case body, and sheet members which are each provided at the four corners with holes and each fixedly attached in place to the major inner surface of the case member is such a manner that the holes receives the corresponding pins on the case member, wherein the distance between the adjacent holes on the sheet member, along one of the sides of the sheet member is longer than the corresponding distance between the pins on the case member in order that the sheet member bends inwardly within the case body with the maximally bent center part thereof resiliently contacting the corresponding side of a tape loaded on the reel hubs.

Other objects and features of the invention will be apparent from the following description taken in connection with the accompanying drawings, in which:

BRIEF DESCRIPTION OF THE DRAWINGS

FIGS. 6 and 7 show another embodiment of the tape cassette according to the invention, in which FIG. 6 shows a plan view of a case member and FIG. 7 shows a plan view of a liner sheet;

FIGS. 9 and 10 show an additional embodiment of the invention in which FIG. 9 shows a plan view of a case member and FIG. 10 shows a plan view of a liner sheet.

DETAILED DESCRIPTION OF THE PREFERRED EMBODIMENTS

Figure 1:
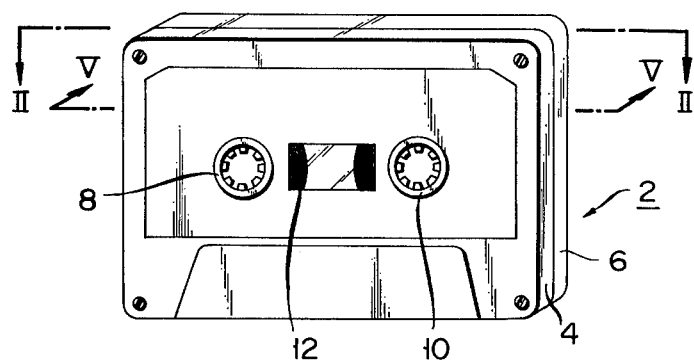
FIG. 1 shows a perpective view of an embodiment of a tape cassette according to the invention.

As shown in FIG. 1 illustrating perspectively an external appearance a cassette case 2 embodying the present invention, a couple of case members 4 and 6 are tightly coupled each other by means of proper coupling means such as screws at the four corners. Within the case body 2 are rotatably provided a couple of reel hubs 8 and 10 with a magnetic tape wound around the hubs so as to travel therebetween. Further provided are liner sheets 14 and 16 attached on the major inner walls of the case members 4 and 6, respectively, in order to reduce friction resistance generating between both sides of the magnetic tape and the corresponding and contacting inner walls of the case members 4 and 6, when the magnetic tape runs. The construction of the case member 4 is substantially the same as that of the member 6 so that only the case member 4 will be described in the specification for the purpose of simplicity.

Figure 3:
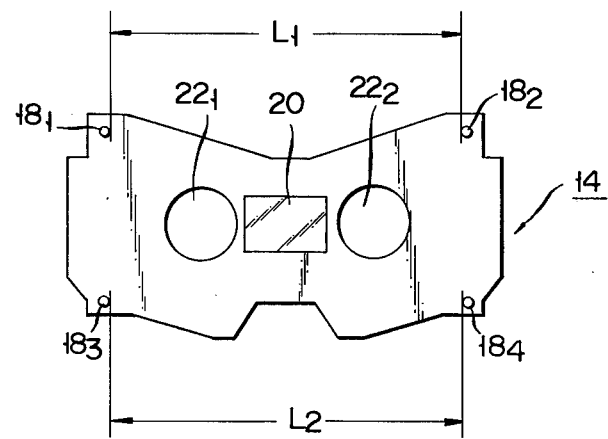
FIG. 3 shows a plan view of a liner sheet of the tape cassette shown in FIG. 1.

Turning to FIG. 3 illustrating the liner sheet 14, holes $18_1$ to $18_4$ are provided at the four corners of the liner sheet 14. The liner sheet 14 is further provided at the central part with a relatively large rectangular opening 20 for observing the traveling of the tape loaded and with a couple of circular openings $22_1$ and $22_2$ disposed at both sides of the rectangular opening 20. The reel hubs 8 and 10 are fitted in the openings $22_1$ and $22_2$.

Figure 4:
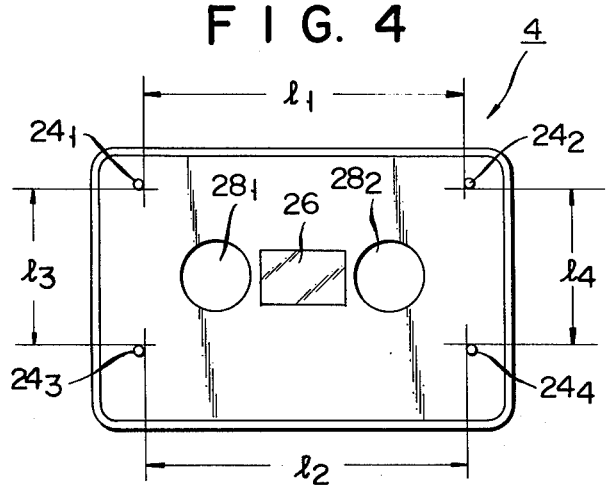
FIG. 4 shows a plan view of a case member of the tape cassette shown in FIG. 1.

As shown in FIG. 4, pins $24_1$ to $24_4$ are planted at the four corners on the major inner surface of the case member 4 and these pins are aligned so as to corresponding insert into the holes $18_1$ to $18_4$ when the tape cassette is assembled. The case member 4 includes, a relatively large rectangular opening 26 serving as a window to see the traveling of the tape and a couple of openings $28_1$ and $28_2$, disposed at both the sides of the window 26, into which the reel hubs 8 and 10 are inserted when the tape cassette is assembled. In fact, holes are additionaly formed at the four corners of the case member 4 through which screws are inserted when it is fastened to the case member 6; however, these holes are omitted for simplicity.

Figure 5:
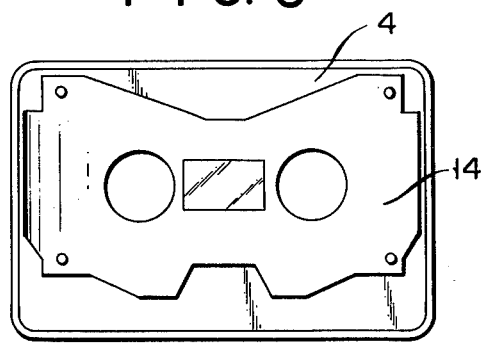
FIG. 5 shows a cross sectional view taken along line V—V in FIG. 1.

Turning now to FIG. 5, there is illustrated a state that the liner sheet 14 is fixedly attached onto the major inner surface of the case member 4, with the insertion of the pins $24_1$ to $24_4$ into the holes $18_1$ to $18_4$.

Figure 2:
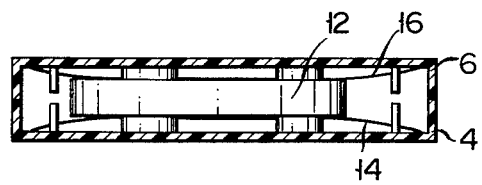
FIG. 2 shows a cross sectional view of the tape cassette taken along line II—II in FIG. 1.

In this example, the distances $L_1$ and $L_2$ between the holes $18_1$ and $18_2$, and $18_3$ and $18_4$ of the liner shat 14 are selected slightly longer than the distances $l_1$ and $l_2$ between the pins $24_1$ and $24_2$, and $24_3$ and $24_4$ of the case member 4, respectively. Therefore, when the liner sheet 14 is fastened onto the major inner surface of the case member 4 as shown in FIG. 4, it is slightly curved upwardly from the inner surface of the case member 4 with the maximum curvature substantially at the central part of the liner sheet 14. This is true for the liner sheet 16. It is for this reason that these liner sheets 14 and 16 both curve inwardly within the case body 2, as shown in FIG. 2, that is to say, those curve toward the center line passing through the centers of the shorter sides in FIG. 2. Accordingly, the tape runs being slightly and resiliently pressed or held at both the sides by the curved liner sheets 14 and 16. This feature is very important because, for example, when the widing speed of the magnetic tape abruptly changes, the movement of the tape in its width direction is prevented therefore to eliminate the irregular running of the tape. Further, the side faces of the wound tape are smooth and uniform which have otherwise the rugged or irregular side faces, and therefore the tape is hardly dameged in the tape handling.

In the embodiment mentioned above, it is prefereable that the distances $L_1$ and $L_2$ between the holes of the liner sheet 14 are equal each other and the distance $l_1$ and $l_2$ between pins on the case member 4 are equal each other, in order to enjoy simplification of the construction.

Figure 6:
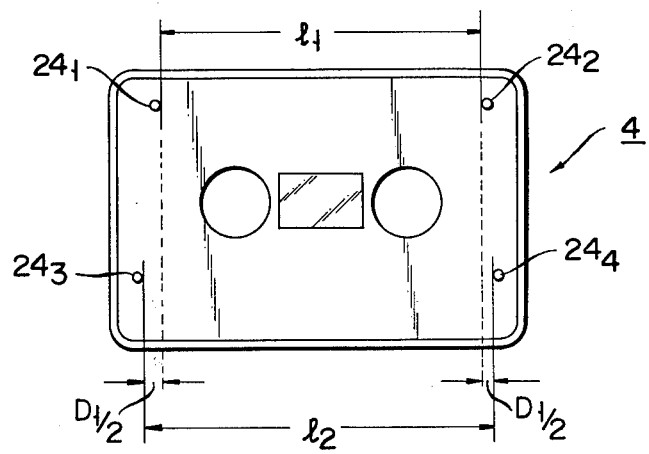
Figure 7:
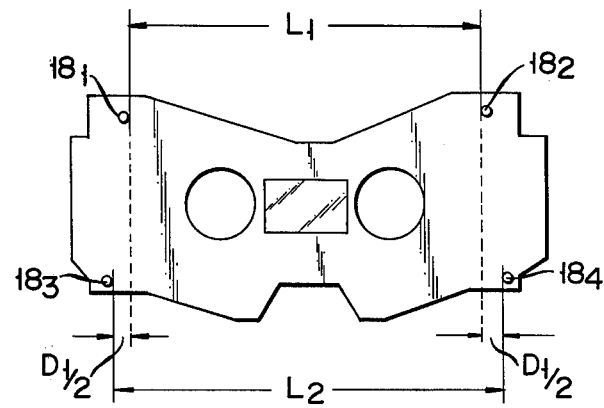

A modification of the above-mentioned example is shown in FIGS. 6 and 7. As shown in FIG. 6, the pin distance $l_2$ may be selected $D_1/2 + D_1/2 = D_1$ longer than the pin distanse $l_1$. Correspondingly, the hole distance $L_2$ may be $D_1/2 + D_1/2 = D_1$ longer than the hole distance $L_2$, as shown in FIG. 7.

Figure 8:
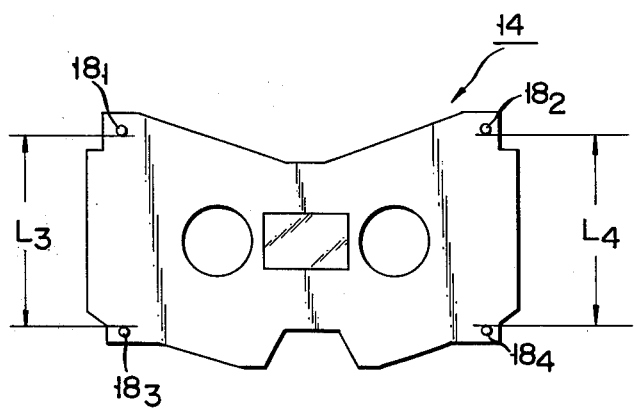
FIG. 8 shows a plan view of the liner sheet for illustrating a still another embodiment according to the invention.

Although, the above-mentioned examples have treated only the pin and hole distances only in the direction in parallel with the line passing through two openings $22_1$ and $22_2$ laterally arranged as viewed in the drawing, the invention may be similarly applicable to those distances in the direction normal to that in the previous cases. For example, the distance $l_2$ between the pins $24_1$ and $24_3$ and distance $l_4$ between the pins $24_2$ and $24_4$, as shown in FIG. 4, may be selected slightly shorter than the distance $L_3$ between the holes $18_1$ and $18_3$ and the distance $L_4$ between the holes $18_2$ and $18_4$, as shown in FIG. 8. Also in this case, when the liner sheet is attached onto the case member, it curves outwardly from the case member with the central maximum curvature. Therefore, the same effects as those attained by the previous embodiments may be expected.

Figure 9:
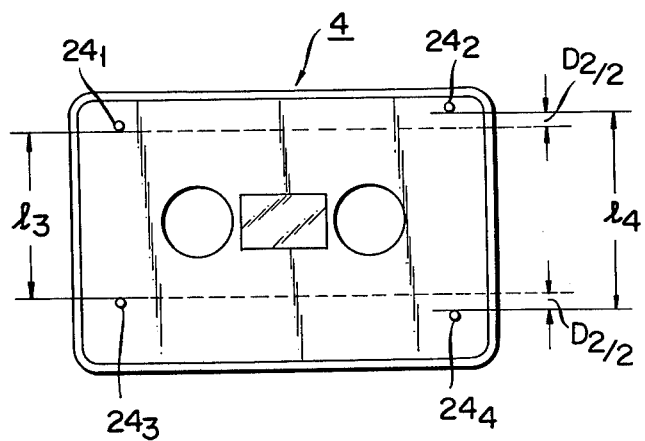
Figure 10:
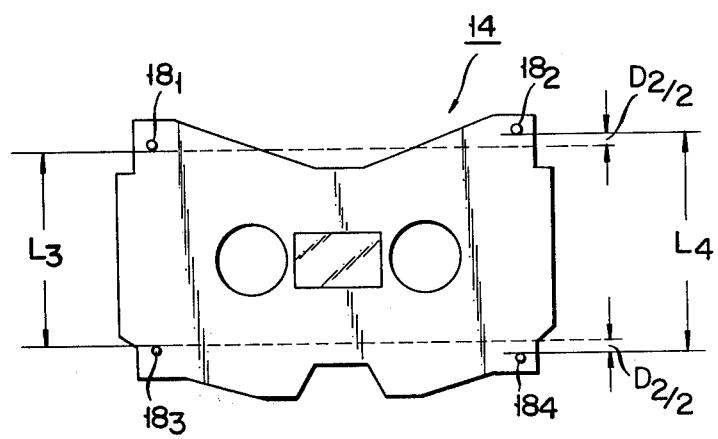

Alternately, the pin distance $l_4$ on the case member 4 may be $D_2/2 + D_2/D2 = D2$ longer than the pin distance $l_3$, as shown in FIG. 9 and the hole distance $L_4$ on the liner sheet 14 may be the same distance longer than the hole distance $L_3$.

What is claimed is:

1. A tape cassette having a pair of case members which are oppositely arranged to form a case body and are each provided with pins at the four corners on the major inner surface, a pair of reel hubs rotatably provided within the case body, and sheet members which are each provided at the four corners with holes and each fixedly attached in place to the major inner surface of the case member in such a manner that the holes receive the corresponding pins on the case member, wherein the distance between each pair of adjacent holes arranged on the sheet member along one of the sides of the sheet member is longer than the corresponding distance between each pair of adjacent pins arranged on the case member in order that the sheet member bends inwardly within the case body, with the maximally bent center part thereof resiliently contacting the corresponding sides of a tape loaded on the reel hubs.

2. A tape cassette according to claim 1, wherein the distance between each pair of adjacent holes on the sheet member along the line connecting two openings for receiving the pair of reel hubs are equal to each other, and the distance between each pair of adjacent pins arranged correspondingly with respect to said hole distance are equal to each other.

3. A tape cassette according to claim 1, wherein one distance between one pair of adjacent holes arranged with respect to said one hole distance is shorter than the other pin distance of the other pair thereof.

4. A tape cassette according to claim 1, wherein the distance between the respective pairs of adjacent holes arranged orthogonal to the line connecting the two openings for receiving the reel hubs are equal to each other, and the distance between the respective pairs of adjacent pins correspondingly arranged with respect to said hole distances are also equal to each other.

5. A tape cassette according to claim 1, wherein one distance between one pair of adjacent holes arranged orthogonally to the line connecting the two openings for receiving the reel hubs is shorter than the other hole distance of the other pair thereof, and one distance between one pair of adjacent pins correspondingly with respect to said one hole distance is shorter than the other pin distance of the other pair thereof.

* * * * *